US007447625B2

(12) United States Patent
Kuo et al.

(10) Patent No.: US 7,447,625 B2
(45) Date of Patent: Nov. 4, 2008

(54) METHOD FOR GENERATING TEXT SCRIPT OF HIGH EFFICIENCY

(75) Inventors: Chih-Chung Kuo, Hsin-Chu (TW); Jing-Yi Huang, Kaohsiung (TW)

(73) Assignee: Industrial Technology Research Institute, Hsin Chu (TW)

( * ) Notice: Subject to any disclaimer, the term of this patent is extended or adjusted under 35 U.S.C. 154(b) by 796 days.

(21) Appl. No.: 10/384,938

(22) Filed: Mar. 10, 2003

(65) Prior Publication Data

US 2004/0054536 A1 Mar. 18, 2004

(30) Foreign Application Priority Data

Sep. 13, 2002 (TW) .............................. 91121060 A

(51) Int. Cl.
*G06F 17/27* (2006.01)

(52) U.S. Cl. ............................ 704/9; 704/235; 704/260

(58) Field of Classification Search ....................... None
See application file for complete search history.

(56) References Cited

U.S. PATENT DOCUMENTS 6,038,533 A * 3/2000 Buchsbaum et al. ........ 704/260

OTHER PUBLICATIONS

Van Santen et al., Methods for optimal text selection, Proc. of Eurospeech97, pp. 553-556, 1997.*

* cited by examiner

*Primary Examiner*—Richemond Dorvil
*Assistant Examiner*—Leonard Saint Cyr
(74) *Attorney, Agent, or Firm*—Birch, Stewart, Kolasch & Birch, LLP

(57) ABSTRACT

This proposal presents performance indices and search criteria for the text script generation in the design of corpus-based TTS systems. Based on our criteria a new search method is presented to solve the text selection problem more systematically and efficiently, unlike previous researches either concentrated on covering rate or on hit rate. By control a weighting factor, the covering rate of unit types can be increased to improve the robustness of the TTS system. Finally, the scalable and controllable design of the multi-stage search can produce various kinds of text scripts ideally suitable for the requirement of various kinds of corpus-based TTS systems.

18 Claims, 5 Drawing Sheets

Covering rate of the 2nd stage search(w=1)

METHOD FOR GENERATING TEXT SCRIPT OF HIGH EFFICIENCY

BACKGROUND OF THE INVENTION

1. Field of the Invention

The present invention generally relates to a method for the text script generation of high efficiency, and more particularly, a method for generating a scalable and controllable text script of high efficiency in the design of corpus-based text to speech (TTS) systems.

2. Description of Prior Art

Because of the improvement of computer hardware, concatenated speech synthesis based on a large corpus becomes a possible way to generate general-purpose speech sounds. Corpus-based TTS has become the major trend because the resulted speech sounds are more natural than that produced by parameter-driven production models. The key issues for this approach include a well-designed and recorded corpus, manual or automatic labeling of segmental and prosodic information, selection or decision of synthesis unit types, and selection of the speech segments for each unit type.

We used to build a synthesizer by directly recording the 411 syllable types in a single-syllable manner. This makes the segmentation easier, avoids co-articulation problem, and usually has a more stationary waveform and steady prosody. However, we not only find that the synthetic speech produced by the speech segments extracted from single syllable recording sounds unnatural, but also believe that this kind of speech segments is not suitable for multiple segment units selection. This is because neither natural prosody nor contextual information could be utilized in a single syllable recording system.

Conventionally, there are two approaches to the text script generation. One is to emphasize the diversity of unit types in the inventory. The other is to pursue the probability for the unit type of an input case to be found in the inventory. The first approach tries to select the text containing richness of phonetic and prosodic features. The text script is usually selected from more than one corpus to search for various kinds of contextual combinations. Even sentences designed purposely by linguists are also used. Fully automatic methods, for example, greedy algorithm are broadly used in some applications, too. The disadvantage of this approach is to produce a text script with large size that will cost a lot both for building a TTS system and for the storage requirement of the system.

The second approach represents the recent trend to use a very large corpus. The weighted greedy algorithm is used to select a subset corpus from a large raw text corpus. The weights could be applied in two ways: occurring frequencies of unit types or reciprocal of frequencies of unit types. There is a list of necessary unit vectors built first by sorting the occurring rate of each unit vector and leaving high-occurring-rate ones that have accumulated frequency larger than a specified number in the list. With the weighted greedy algorithm, the sentence with highest sum of weights will be selected first, and then occurred units would be deleted in the list of necessary unit vectors. The occurring rates of the unit types in the large corpus are taken into account in text script generation so as to maximize the probability to hit the same unit type in synthesis. Since there exist risks of missing some core unit types, an approach is to fill up enough number of each core unit types in the list. The problem is some kind of fixed, but the algorithm will not be precisely controllable and flexibly scalable. One cannot decide when to stop the procedure except end of the experiment and passively accept the resulted hit rate, covering rate, and text script size.

As aforementioned, we invent an integrated new method for generating text script in corpus based TTS design to produce better performance so the disadvantages mentioned above can be overcome.

SUMMARY OF THE INVENTION

Conventional approaches to the text script generation, one is to emphasize the diversity of unit types in the inventory (covering rate of unit types). The other is to pursue the probability for the unit type of an input case to be found in the inventory (hit rate of unit instances). Based on previous mentioned, It is an objective for present invention to provide a method for generating a text script which contains as many unit types as possible so any input case can find its corresponding unit types in the inventory.

It provides a method according to occurring frequencies of unit types for generating a text script which contains as many as unit instances so that the probability of an input case to be found in the inventory will be the highest. It still provides a method for generating a scalable and controllable text script by the different selection criteria.

A method for the text script generation of high efficiency provided by the present invention solves the text selection problem more systematically and efficiently based on three search criteria, such as covering-rate efficiency, hit-rate efficiency, and integrated efficiency, and termination criteria, such as threshold for script size, covering rate, hit rate, and integrated rate, for the text script generation in the design of corpus-based TTS (Text to Speech) systems. By controlling a weighting factor the covering rate and hit rate can be increased to improve the robustness of the TTS system. Finally, scalable and controllable design of the multi-stage search can produce various kinds of text scripts ideally suitable for the requirement of various kinds of corpus-based TTS systems.

One preferred embodiment of this invention: first, selecting $N_1$ sentences with best integrated efficiency from a source corpus comprised by at least a sentence and resulting $N_1$ sets, wherein each set of the $N_1$ sets comprised by at least a sentence; repeating procedures for generating text script of high efficiency until satisfying a termination criterion, the procedures comprising: deleting the sentences in the $N_i$ set from the source corpus and resulting $N_i$ corpuses; selecting $M_{i+1}$ sentences with best integrated efficiency from each of the $N_i$ corpuses and resulting $N_i \times M_{i+1}$ sets; selecting $N_{i+1}$ sets with best integrated efficiency from the $N_i \times M_{i+1}$ sets; and when a termination criterion satisfied, the $N_{i+1}$ sets are the text script of high efficiency, otherwise the former $N_{i+1}$ sets replace the $N_i$ sets and continue searching loop, wherein i meaning an $i^{th}$ procedure, i=1, 2, . . . ; $N_{i+1}$ being a number of said selected sets with best integrated efficiency in said $i^{th}$ procedure; $M_{i+1}$ being a number of said selected sentences with best integrated efficiency from a $N_i$ corpuse; Mj and Nj being an integer and greater than one, j=1, 2, . . . ; and said integrated efficiency being decided upon a integrated efficiency function that comprising reciprocals of total unit instances of said $N_i$ corpuses.

Another preferred embodiment of this invention: first, selecting $N_1$, sentences aimed at a unit-class with best integrated efficiency from a source corpus comprised by at least a sentence and resulting $N_1$ sets, wherein the source corpus comprising by at least a unit instance corresponding to at least a unit type, the unit-class separated different classes according to the unit types and each set of the $N_1$ sets comprised by at least a sentence; repeating procedures for generating text script of high efficiency until satisfying a termination criterion, the procedures comprising: deleting the sentences in the $N_i$ set from the source corpus and resulting $N_i$ corpuses; selecting $M_{i+1}$ sentences with best integrated efficiency from each of the $N_i$ corpuses and resulting $N_i \times M_{i+1}$ sets; selecting $N_{i+1}$ sets with best integrated efficiency from the $N_i \times M_{i+1}$, sets; and when a termination criterion satisfied, the $N_{i+1}$ sets are the text script of high efficiency, otherwise the former $N_{i+1}$ sets replace the $N_i$ sets and continue searching loop, wherein i meaning an $i^{th}$ procedure, i=1, 2, . . . ; $N_{i+1}$ being a number of said selected sets with best integrated efficiency in said $i^{th}$ procedure; $M_{i+1}$ being a number of said selected sentences with best integrated efficiency from a $N_i$ corpuse; Mj and Nj being an integer and greater than one, j=1, 2, . . . ; and said integrated efficiency being decided upon a integrated efficiency function that comprising reciprocals of total unit instances of said $N_i$ corpuses.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following detailed description, and the accompanying drawings, which are given by way of illustration only, and thus are not limitative of the present invention, and wherein.

DESCRIPTION OF THE PREFERRED EMBODIMENT

In the following, firstly, the problem will be defined formally, then it will present performance indices and selection criteria for the problem. Based on the criteria, various search methods will be described below. Experiment results and conclusion are also shown.

I Problem Definition

Define the unit type function as follows:

$$u=t(x) \tag{1}$$

where u is the unit type to which the unit instance x belongs.

Define two mapping functions of sets as follows:

The unit-type covering function:

$$U=T(X)=\{u=t(x)|\forall x \in X\} \tag{2}$$

The unit-instance gathering function:

$$X'=G(X,U)=\{x'|\forall x' \in X \text{ and } t(x') \in U\} \tag{3}$$

where X is a set of unit instances and U is a set of unit types.

Obviously, we have G(X,T(X))=X, or more generally, $\forall X_S \subseteq X$, $G(X,T(X_S))=X'i \Rightarrow X_S \subseteq X' \subseteq X$.

Figure 1:
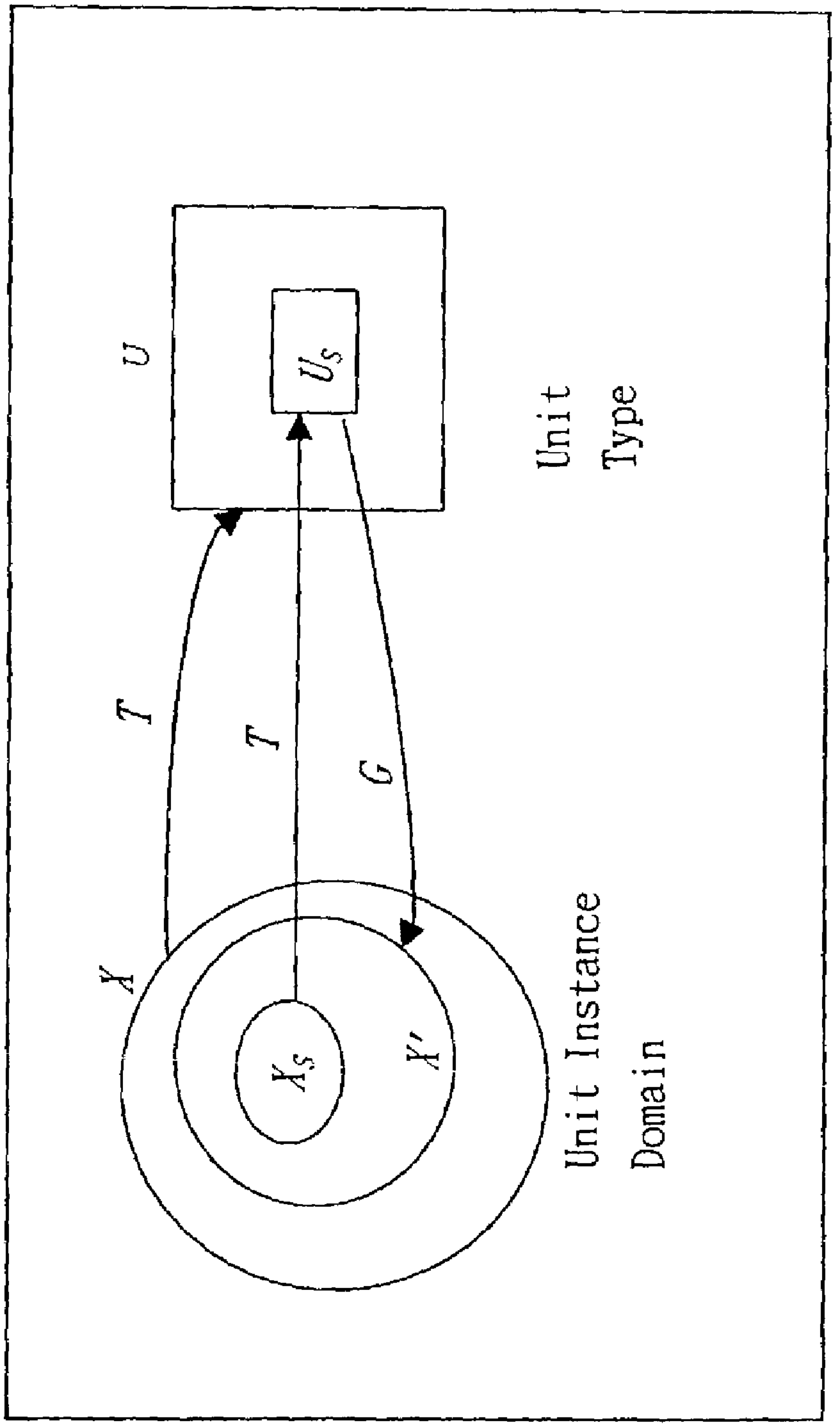
FIG. 1 is the problem visualization.

The problem can be clearly visualized in FIG. 1, where the sets are defined as follows:

X: the set of all unit instances in the corpus;

$X_S$: the set of all unit instances in the selected text script;

U: the set of unit types covered by X, i.e., U=T(X);

$U_S$: the set of unit types covered by XS, i.e., $U_S=T(X_S)$;

X': the set of all unit instances gathered by $U_S$, i.e. $X'=G(X, U_S)=G(X, T(X_S))$. It's clear that $X_S \subseteq X' \subseteq X$ and $U_S \subseteq U$.

The problem is to find the text script, $X_S$, to meet two virtually contradictive goals which are first, the text script should cover as many unit types as possible so that when any text is input to the TTS system there are suitable unit instances could be found for concatenation. However, the occurring frequency of each unit type differs dramatically, so the practical possibility for finding a match unit should also be considered, and second, the size of the text script (i.e. the amount of instances contained) should be as small as possible so that not only the processing cost of speech corpus could be less but also the memory requirement of the TTS system could be lower.

II Performance Indices & Selection Criteria

1. Performance Indices

The first goal for the selected text script $X_S$ is to cover as many unit types as possible. Therefore, the first performance index can be the unit-type Covering Rate (CR) defined as follows:

$$r_C = \frac{|U_S|}{|U|} = \frac{|T(X_S)|}{|T(X)|} \leq 1 \tag{4}$$

The notation $|U_S|$ represents the size of the set $U_S$, i.e., the number of the elements in the set $U_S$.

As mentioned before, the occurring rate of each unit type is quite different. Thus, the total instances gathered by the $U_S$ must be considered, too. Thus, the second performance index, the unit-type Hit Rate (HR) is defined as follows:

$$r_H = \frac{|X'|}{|X|} = \frac{|G(X, T(X_S))|}{|X|} \leq 1 \tag{5}$$

2. Selection Criteria

The first goal is therefore to maximize the covering rate or the hit rate. On the other hand, the second goal mentioned is to minimize the size of the text script, i.e., $|X_S|$. To combine the two contradictive goals together, we define the following three criteria for the selection of the text script:

a. Covering-Rate Efficiency:

$$\eta_C = \frac{r_C}{|X_S|} = \frac{|U_S|}{|U||X_S|} \tag{6}$$

b. Hit-Rate Efficiency:

$$\eta_H = \frac{r_H}{|X_S|} = \frac{|X'|}{|X||X_S|} \tag{7}$$

c. Integrated Efficiency:

$$\eta_I = \frac{1}{|X|}\left(\frac{\alpha\cdot|X'| + (1-\alpha)\cdot\mu\cdot|U_S|}{|X_S|}\right) \quad (8)$$

where $$\mu = \frac{|X|}{|U|} \geq 1$$

is the average number of instances per unit type, and ω is the weighting factor with the value 0≦w≦1. It's clear that the formula in Eq. (6) and (7) are the special cases of that in Eq. (8) when ω=0 and ω=1, respectively.

The essence of the present invention is that it can achieve better covering-rate $r_C$ and better hit-rate $r_H$ under less text script $X_S$. In the main, the less text script $X_S$. and the better covering-rate $r_C$, the better hit-rate $r_H$ are repulsive. Hence, a best condition that simultanously satisfeis less text script $X_S$., the better covering-rate $r_C$ and the better hit-rate $r_H$ can be estimated with Eq. (6) and Eq.(7). On the basis of the following essence: a reciprocal of less text script $X_S$.is bigger, numbers of better covering-rate $r_C$ and better hit-rate $r_H$ are bigger, Eq. (6) and Eq. (7) also can be rewritten as:

Covering-Rate Efficiency:

$$\eta_C = \alpha r_C + \beta |X_S|^{-1} \quad (9)$$

Hit-Rate Efficiency:

$$\eta_H = \kappa r_H + \epsilon |X_S|^{-1} \quad (10)$$

where α, β, κ and ϵ are parameters and adjustable numbers thereof according to different conditions for archieving at its best.

Eq. (8) can be rewritten according to Eq. (9) and Eq. (10). Hence, any equations of covering-rate efficiency and hit-rate efficiency conforming with the essence of the present invention can be as the selection criteria of the present invention.

III Search Methods

Although the corpus is represented as a set of unit instances above, the practical corpus is made up of sentences of text. The minimal unit for recording is a sentence. This means that the text script is a list of sentences that were selected from the corpus one by one. Therefore the generation of the text script is actually a search problem that tries to select the best possible list of sentences from the corpus.

The present invention provides a method for generating text script. The procedures to select a text script with high efficiency are described below: 1. Based on specific selection efficiency, selecting N best sentences, and generating N original sets, then end the first loop. 2. Starting the second searching loop, for each set, selecting M best sentences from a corpus exclusive of selected sentence in previous loops, where M may be not equal to N or may be equal to N, so there will be total N×M sets. 3. Based on specific selection efficiency, keeping the best N sets for the next loop. 4. In the following searching loop, repeating the same procedures mentioned above until a particular termination criterion is satisfied and the new best sentences are not equal to the former best sentences. 5. Computing the final efficiency for each N set and choosing the set with the best final efficiency as a text script. The N, M are an integer and are greater than one, and the numbers of the selected M and N may be different in each loop.

Next, the procedures with N, M=2 in each loop will be described as below: 1. selecting two sentences (first sentence and second sentence with best two integrated efficiency from source corpus and placing the first sentence into a first set, and the second sentence into a second set and end of first loop search; 2. deleting the sentences in the first set from source corpus from which selecting two sentences (third sentence and fourth sentence) with best two integrated efficiency and placing the first sentence and the third sentence into a third set, the first sentence and the fourth sentence into a fourth set; 3. deleting the sentences in the second set from source corpus from which selecting two sentences (fifth sentence and sixth sentence) with best two integrated efficiency and placing the second sentence and the fifth sentence into a fifth set, the second sentence and the sixth sentence into a sixth set then end of second loop search; 4. keeping two sets with the best two integrated efficiency from the sets from third set to the sixth set where the contents within any of two sets can't be the same and based on these two sets, executing the next loop search; 5. with the same procedures, executing the third loop search, the fourth loop search . . . until a termination criterion is satisfied. 5. finally, choosing the set with the best integrated efficiency as the text script.

The termination criteria for terminating selection loop are as below:

- $|X_S|$: Instance size. The search can stop when the selected text script has achieved a predefined size. For core unit search, the $|X_S|$ could represent the number of selected instances per unit type. Some floor value of instance size for each unit type could be defined to assure a minimal number of instances being selected for each core unit.
- $r_H$: hit rate. This is useful because we can control the hit rate of the resulting TTS inventory.
- $r_C$: covering rate of unit types.
- $r_1=\alpha\cdot r_H+(1-\alpha)\cdot\mu_X\cdot r_C$: integrated index of hit-rate and covering-rate.

The criteria above can be used in any combination according to practical consideration. For example, stop searching if $|X_S|$>threshold1 or ($r_H$>threshold2 and $r_C$>threshold3).

The logical search criteria are the selection criteria Eq.(6), (7), or (8). For each un-selected sentence in the corpus, the temporary "accumulated efficiency" can be computed with the formula in Eq. (6), (7), or (8). However, the better guess to achieve the global optimum is to select the sentence with the best efficiency except for the unit types already being selected before this search. That is, if the $X_S$ is the set of unit instances of the sentence and the $U_S$ is the set of unit types contained in the sentence except for those already being covered, the formula in Eq. (6), (7), or (8) could be used as the selection criterion.

IV Scalable Multi-Stage Search

Different criteria can also be used in different stages of multi-stage search described below. The definition of unit types can range dramatically from a few context-independent units to huge amount of contextual units. Different requirements for each kind of unit type class must be considered. Therefore, a multi-stage search method is designed to generate a more balanced text script. Usually, the fewer core unit types require better type covering and should be selected first. This is because the cost for a core unit missing is higher. For robust consideration, the core unit types should be covered as many as possible. On the other hand, the larger amount of variant unit types expect better hit rate to achieve higher average performance and usually be searched in a latter stage.

The whole search algorithm is very general and flexible. Many different unit type classes can be used in any stage. Therefore, the dimension and resolution of the unit class can be scalable. Many criteria can be used to control the generated text script to meet any pre-defined specification. This implies that the performance and cost can be scalable and precisely controllable.

V Experiments

The source corpus in our experiments contains two parts. A smaller part is a phonetically balanced corpus consisting of manually collected or designed sentences that cover all 413 Mandarin syllables. A much larger part of the corpus contains sentences extracted from various materials in real life, including articles, newspaper, textbooks, dialog, interview, etc. The size of the final corpus, |X|, is 6,621,809 syllable instances, which is distributed in 617,734 sentences. Mandarin Chinese TTS is the target system of this proposal. The 413 Mandarin syllables are chosen as the basic synthesis unit because a Chinese character is a monosyllable. Starting from the basic unit, different degrees of expansion of the unit types can be defined based on various phonetic and prosodic features about the unit.

Table. 1 shows the features used for defining unit types in our experiments. The pronunciation of each Chinese character is specified by both a syllable and a tone. The context features of a character are correlated to the neighbor character that includes right character (Right) and left character (Left), and the syllable position inside a word (intra-word) and the word position inside a sentence (intra-sentence) that and features are about. The words could be lexical words or even better prosodic words.

TABLE 1

| | | | Phonetic | Prosodic | Priority |
|---|---|---|---|---|---|
| Self features | | | Syllable | Tone | Must |
| Context features | Neighbor | Left | LPhone | LTone | Should |
| | | Right | RPhone | RTone | |
| | Intra-Word | | | JWord | Should |
| | Intra-Sentence | | | ISent | May |

TABLE 2

| Unit | UV | | CV | | | | CUV | | |
|---|---|---|---|---|---|---|---|---|---|
| class | U0 | U1 | C1 | C2 | C3 | C4 | CU2 | CU3 | CU4 |
| Syllable | 413 | 413 | 1 | 1 | 1 | 1 | 413 | 413 | 413 |
| Tone | 1 | 5 | 1 | 1 | 1 | 1 | 5 | 5 | 5 |
| L-Phone | 1 | 1 | 10 | 11 | 14 | 17 | 11 | 14 | 17 |
| R-phone | 1 | 1 | 22 | 26 | 29 | 38 | 26 | 29 | 38 |
| L-Tone | 1 | 1 | 2 | 2 | 5 | 6 | 2 | 5 | 6 |
| R-Tone | 1 | 1 | 2 | 2 | 5 | 6 | 2 | 5 | 6 |
| I-Word | 1 | 1 | 2 | 4 | 4 | 9 | 4 | 4 | 9 |
| I-Sent | 1 | 1 | 1 | 4 | 4 | 4 | 4 | 4 | 4 |
| Space size | 413 | 2065 | 1.8 K | 18 K | 162 K | 837 K | 38 M | 335 M | 1.7 G |

Any a unit type can be specified by a feature vector consisting of various dimensions of features. The feature vector with the features of the unit itself is called Unit Vector (UV) in this proposal. On the other hand, the Context Vector (CV) consists of context information of a unit. Therefore, context-dependent unit is specified by Contextual Unit Vector (CUV), which is concatenated by UV and CV. Table 2 shows the size of the feature vector space depends on the resolution of each feature dimension based on Table 1. Three typical unit classes, CU2, CU3, and CU4, are used in our experiments.

1. 2-Stage Search with Different Unit Classes

The simplest multi-stage search is to search for U1 unit in the first stage and the CU2~CU4 in the second stage. The U1 represents the core unit types, which are context-independent and are essential for the completeness of the synthesizer. The CU2~CU4 class expands the unit types into context-dependent units, which are expected to cover various phonetic and prosodic contexts so as to improve the synthetic speech quality.

Figure 2A:
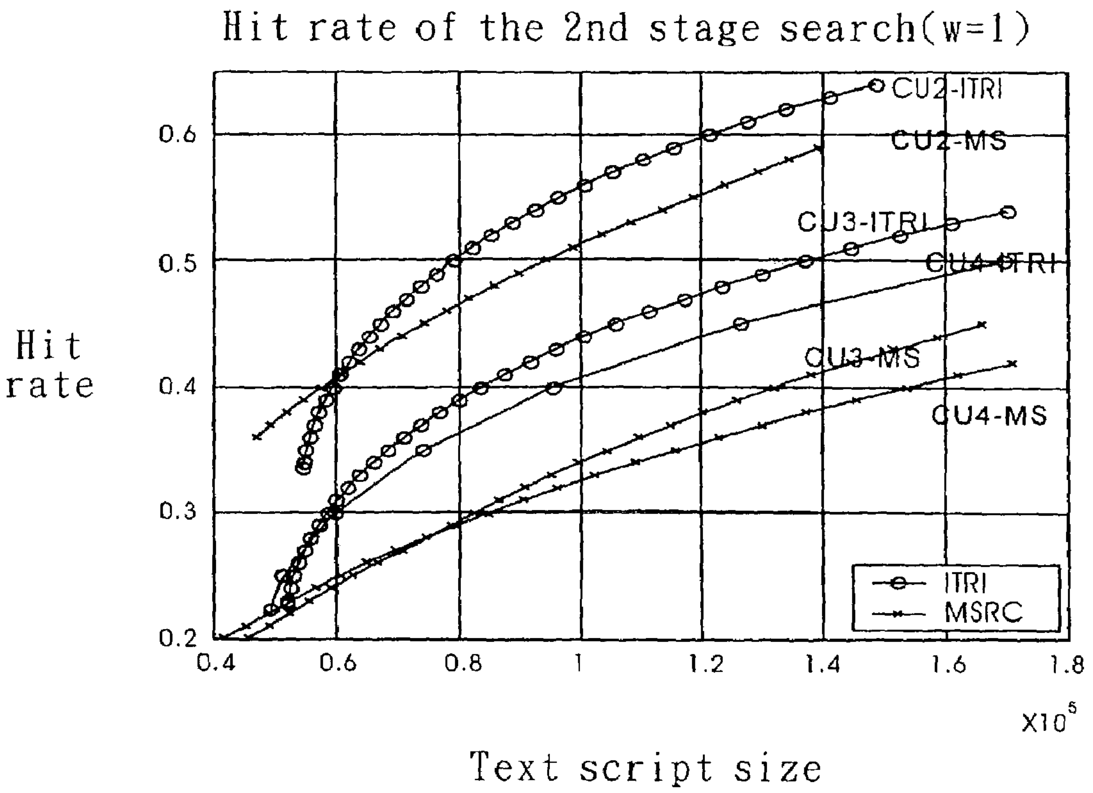
FIG. 2A shows a plot of [hit rate vs. text script size] of 2-stage search result with different unit classes.
Figure 2B:
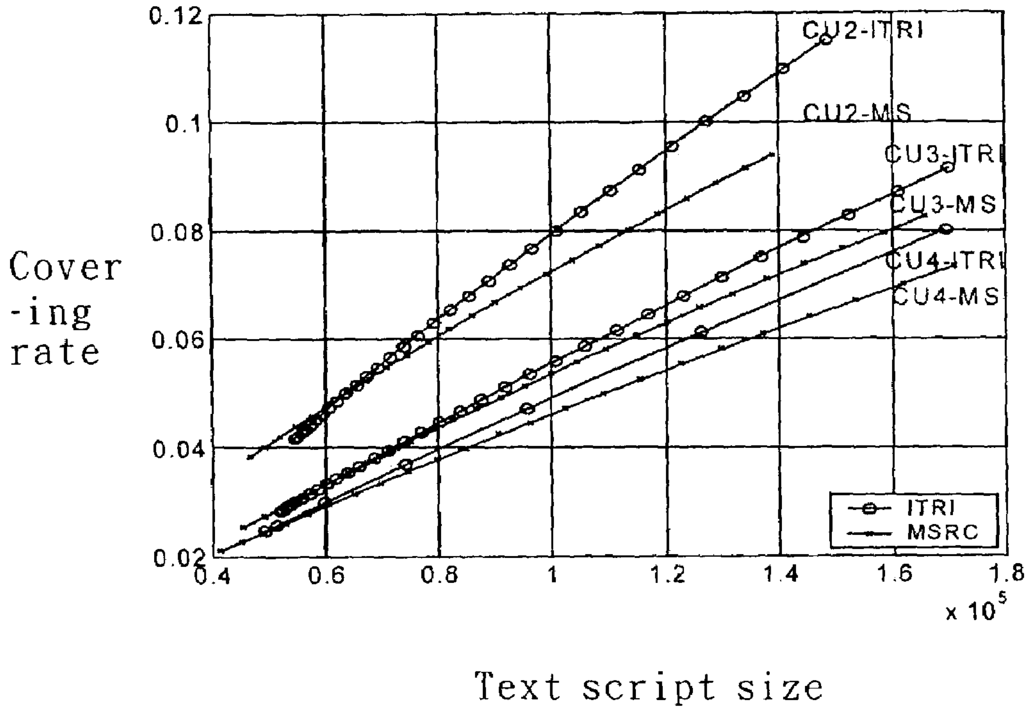
FIG. 2B shows a plot of [covering rate vs. text script size] of 2-stage search result with different unit classes.

In the first stage, the weight ω is 0 for emphasizing the covering rate and the termination criterion is to select a minimal number of instances for each unit type. In the second stage, the weight ω is 1 to pursue the maximal hit rate. The performance results are given in FIG. 2. The search method described in the second method of prior art is also implemented and tested for comparison. It's clear that our results (denoted as ITRI) outperform the prior art (denoted as MS) in hit rate and even in covering rate with the same text script size. The results also show that the hit rate and covering rate descend with the space size of the unit class.

2. 2-Stage Search with Different Weighting Factors

Figure 3A:
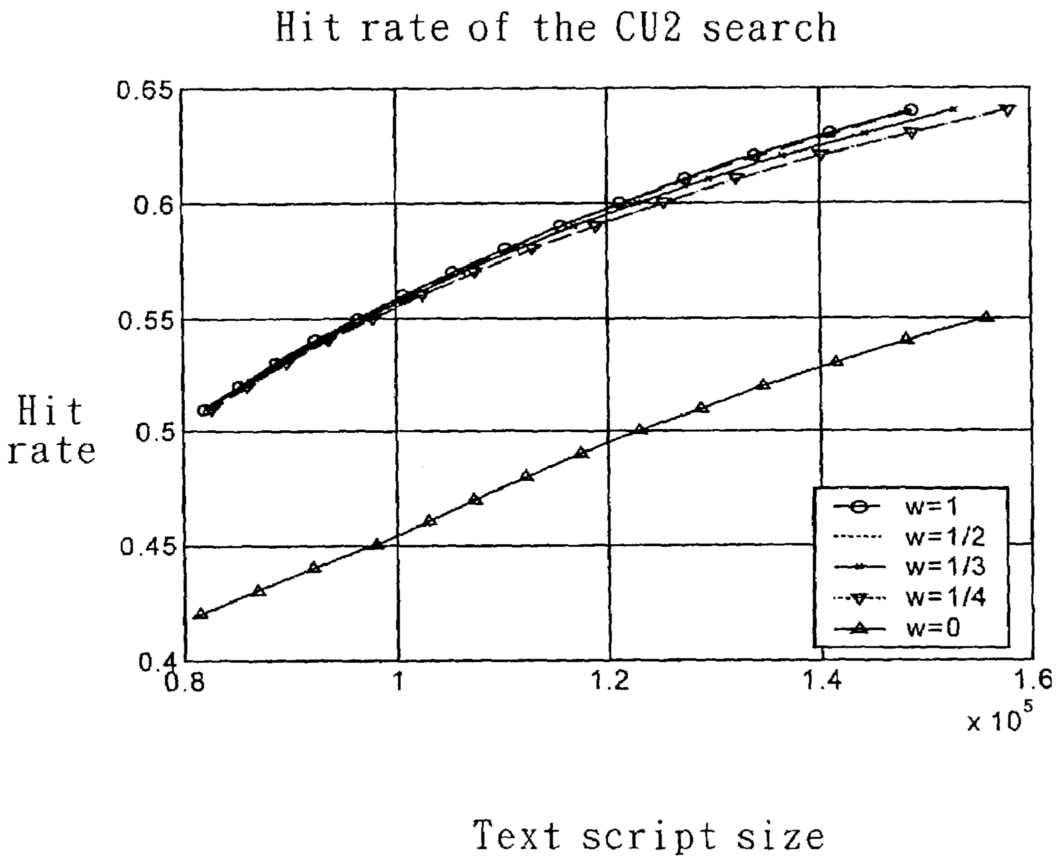
FIG. 3A is a plot of [hit rate vs. text script size] of search result with different weighting factors.
Figure 3B:
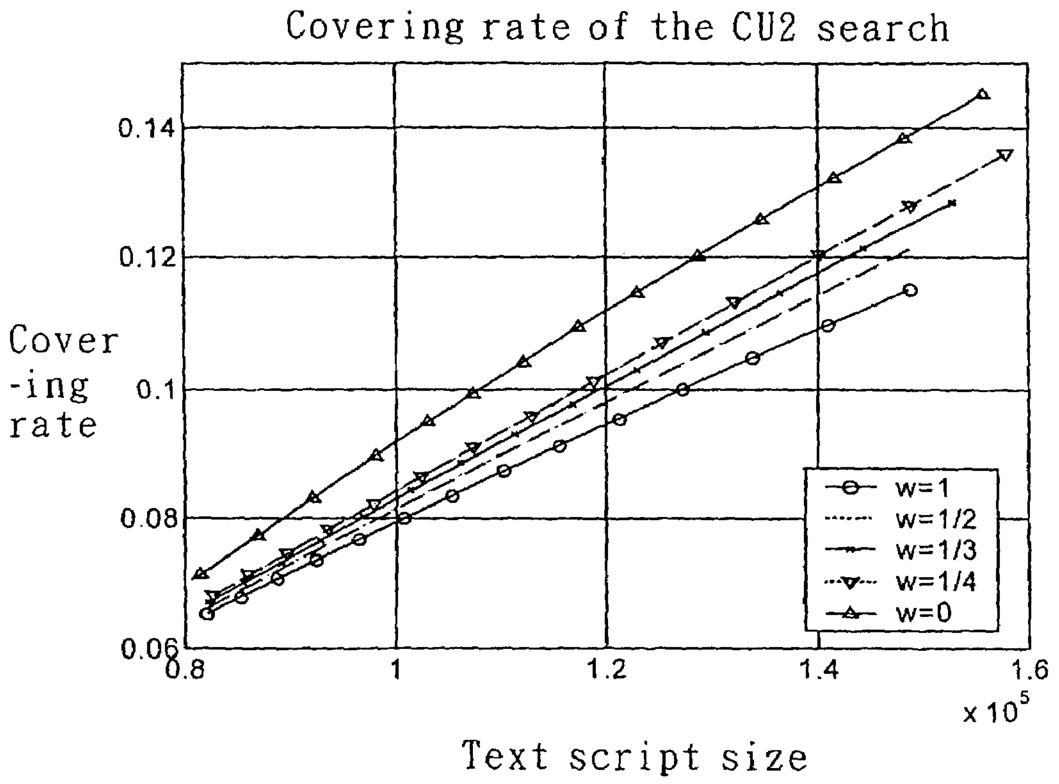
FIG. 3B is a plot of [covering rate vs. text script size] of search result with different weighting factors.

FIG. 3 gives the result of U1-CU2 2-stage search with the weighting factor ω of 5 values in the CU2 stage. It's clear that the covering rate can be increased when ω approaching 0. The hit rate decreases only slightly except for ω=0.

A 3-stage search method is given in Table. 3 as an example. Through this kind of design, we can obtain the text script that contains unit types of various degrees of significance with specified hit rate or covering rate.

TABLE 3

| | | | Termination criteria | | |
|---|---|---|---|---|---|
| Stage | Unit | w | Instance size | Covering rate | Hit rate |
| 1 | U1 | 0 | 10 per type | 100% | 100% |
| 2 | CU2 | 0.25 | Unlimited | >10% | >50% |
| 3 | CU3 | 1 | >150 K | Unlimited | Unlimited |

With hit rate fixed to 40% as a termination criterion, the searching results based on CU2, CU3, and CU4 are given in Table. 4. As shown, we can obtain a text script with a smaller size using prevent invention (ITRI) than using prior art (MSRC).

TABLE 4

| | CU2 | | CU3 | | CU4 | |
|---|---|---|---|---|---|---|
| | MSRC | ITRI (w = 1) | MSRC | ITRI (w = 1) | MSRC | ITRI (w = 1) |
| \|Xs\| | 57472 | 59218 | 131833 | 83596 | 153535 | 95458 |

As above mentioned, the present invention provides a new search method to solve the text selection problem more systematically and efficiently based on three search criteria, such as covering-rate efficiency, hit-rate efficiency, and integrated efficiency, and termination criteria, such as threshold for script size, covering rate, hit rate, and integrated rate, for the text script generation in the design of corpus-based TTS (Text to Speech) systems. By controlling a weighting factor the covering rate and hit rate can be increased to improve the robustness of the TTS system. Finally, scalable and controllable design of the multi-stage search can produce various kinds of text scripts ideally suitable for the requirement of various kinds of corpus-based TTS systems.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claim is:

1. A method of generation text script of high efficiency, said method comprising:

selecting $N_1$ sentences with best integrated efficiency from a source corpus comprised by at least a sentence and resulting $N_1$ sets, wherein each set of said $N_1$ sets has at least a sentence;

repeating procedures for generating text script of high efficiency until satisfying a termination criterion, said procedures comprising:

deleting the sentences in said $N_i$ sets from said source corpus and resulting in $N_i$ corpora, wherein $N_i$ is equal to or greater than two;

correspondingly selecting $M_{i+l}$ sentences with best integrated efficiency from each of said $N_i$ corpora and resulting in $N_i \times M_{i+1}$ sets, wherein each of the $N_i \times M_{i+1}$ sets is generated by placing each of the $M_{i+1}$ sentences into a corresponding set of the $N_i$ sets of a previous procedure;

selecting $N_{i+1}$ sets with best integrated efficiency from said $N_i \times M_{i+1}$ sets;

replacing said $N_i$ sets with said $N_{i+1}$ sets when a termination criterion is satisfied and the set with best integrated efficiency among said $N_{i+1}$ sets is said text script of high efficiency; and storing said text script in a memory, and said text script being used as text script for corpus of TTS (text to speech);

wherein i meaning an $i^{th}$ procedure, i=1, 2, . . . ; $N_{i+1}$ being a number of said selected sets with best integrated efficiency in said $i^{th}$ procedure; $M_{i+1}$ being a number of said selected sentences with best integrated efficiency from one of the $N_i$ corpora; $M_i$ and $N_i$ being an integer and greater than or equal to one, j=1, 2, . . . ; and said integrated efficiency being decided upon an integrated efficiency function that comprising reciprocals of total unit instances of said selected sentence or set of sentences.

2. The method according to claim 1, wherein said integrated efficiency function is combination of a hit-rate efficiency, a covering-rate efficiency, and a weighting factor.

3. The method according to claim 2, wherein said sentences of said source corpus comprises at least a unit instance, said unit instance corresponds to at least a unit type, where said at least a unit type comprises at least a set of unit type.

4. The method according to claim 3, wherein said hit-rate efficiency is the ratio of a hit rate and total unit instances of said $N_i$ sets.

5. The method according to claim 4, wherein said hit rate is the ratio of total unit instances gathered by set of unit types of said $N_i$ sets and total unit instances gathered by said source corpus.

6. The method according to claim 3, wherein said covering-rate is the ratio of a covering rate and said unit instances of said $N_i$ sets.

7. The method according to claim 6, wherein said covering-rate is the ratio of said total unit type of said $N_i$ sets and total unit type of said source corpus.

8. The method according to claim 3, said termination criterion being selected from the group consisting of a set text script size, a set hit rate, a set covering rate, and a set integrated rate, wherein said text script size is the number of unit instances covered by said set corresponding to said $N_i$ sets respectively;

said set hit rate is the ratio of total unit instances gathered by sets of unit types covered by said unit instances covered by said set corresponding to said $N_i$ sets respectively and total unit instances gathered by said source corpus;

said set covering rate is the ratio of total unit types covered by said set corresponding to said $N_i$ sets respectively and total unit types covered by said source corpus; and said set integrated rate is combination of said set hit-rate efficiency corresponding to said $N_i$ sets respectively and said covering-rate efficiency corresponding to said $N_i$ sets respectively.

9. The method according to claim 1, said selecting sets are not entirely equal to said former selecting sets when resulting $N_i \times M_{i+1}$ sets.

10. A method of scalably generating text script of high efficiency, said method comprising:

selecting $N_1$ sentences aimed at a unit-class with best $N_1$ integrated efficiency from a source corpus comprised by at least a sentence and resulting $N_1$ sets, wherein said source corpus comprising by at least a unit instance corresponding to at least a unit type, said unit-class separated different classes according to said unit types, and each set of said $N_1$ sets comprised by at least a sentence;

repeating procedures for generating text script of high efficiency until satisfying a termination criterion of unit-class, said procedures comprising:

selecting $N_1$ sentences with best integrated efficiency from a source corpus comprised by at least a sentence and resulting $N_1$ sets, wherein each set of said $N_1$ sets comprised by at least a sentence;

repeating procedures for generating text script of high efficiency until satisfying a termination criterion, said procedures comprising:

deleting the sentences in said $N_i$ sets from said source corpus and resulting in $N_i$ corpora, wherein $N_i$ is equal to or greater than two;

correspondingly selecting $M_{i+l}$ sentences with best integrated efficiency from each of said $N_i$ corpora and resulting in $N_i \times M_{i+1}$ sets, wherein each of the $N_i \times M_{i+1}$ sets is generated by placing each of the $M_{i+1}$ sentences into a corresponding set of the $N_i$ sets of a previous procedure;

selecting $N_{i+1}$ sets with best integrated efficiency from said $N_i \times M_{i+1}$ sets;

replacing said $N_i$ sets with said $N_i$ sets when a termination criterion is satisfied and the set with best integrated efficiency among said $N_{i+1}$ sets is said text script of high efficiency; and storing said text script in a memory, and said text script being used as text script for corpus of TTS (text to speech);

wherein i meaning an $i^{th}$ procedure, i=1, 2, . . . ; $N_{i+1}$ being a number of said selected sets with best integrated efficiency in said $i^{th}$ procedure; $M_{i+1}$ being a number of said selected sentences with best integrated efficiency from one of the $N_i$ corpora; $M_i$ and $N_i$ being an integer and greater than or equal to one, j=1, 2, . . . ; and said integrated efficiency being decided upon an integrated efficiency function that comprising reciprocals of total unit instances of said selected sentence or set of sentences.

11. The method according to claim 10, said unit-class separates different class according to self features and context features of said unit types.

12. The method according to claim 10, wherein said integrated efficiency function is combination of a hit-rate efficiency, a covering-rate efficiency, and a weighting factor.

13. The method according to claim 12, wherein said covering-rate is the ratio of a covering rate and said total unit instances of said $N_i \times M_{i+1}$ sets.

14. The method according to claim 13, wherein said covering-rate is the ratio of said total unit types gathered by said unit instances of said $N_i \times M_{i+1}$ sets and total unit types gathered by said unit instances of said source corpus.

15. The method according to claim 12, wherein said hit-rate is the ratio of a hit rate and said total unit instances of said $N_i \times M_{i+1}$ sets.

16. The method according to claim 15, wherein said hit-rate is the ratio of said total unit types gathered by said unit type of said $N_i \times M_{i+1}$ sets and total unit types gathered by said unit instances of said source corpus.

17. The method according to claim 10, said termination criterion being selected from the group consisting of a text script size of unit instance, a hit rate of unit instance, a covering rate of unit type, and an integrated rate, wherein said text script size of unit instance is the number of unit instances covered by said set corresponding to said $N_i$ sentences respectively;

said hit rate of unit instance is the ratio of total unit instances gathered by sets of unit types covered by said set corresponding to said $N_i$ sentences respectively and total unit instances gathered by said source corpus;

said covering rate of unit type is the ratio of total unit types gathered by unit instances covered by said set corresponding to said $N_i$ sentences respectively and total unit types covered by said unit instances of said source corpus; and said integrated rate is combination of said set hit-rate efficiency corresponding to said $N_i$ sentences respectively and said covering-rate efficiency corresponding to said $N_i$ sentences respectively.

18. The method according to claim 1, said selecting sets are not entirely equal to said former selecting sets when resulting $N_i \times M_{i+1}$ sets.

* * * * *